(12) United States Patent
Pollard (10) Patent No.: US 8,146,203 B2
(45) Date of Patent: Apr. 3, 2012

(54) CASTOR ASSEMBLY

(76) Inventor: James Pollard, Doncaster (GB)

( * ) Notice: Subject to any disclaimer, the term of this patent is extended or adjusted under 35 U.S.C. 154(b) by 532 days.

(21) Appl. No.: 12/306,305

(22) PCT Filed: Jun. 26, 2007

(86) PCT No.: PCT/GB2007/050358
§ 371 (c)(1),
(2), (4) Date: Feb. 25, 2009

(87) PCT Pub. No.: WO2008/001131
PCT Pub. Date: Jan. 3, 2008

(65) Prior Publication Data
US 2010/0031467 A1    Feb. 11, 2010

(30) Foreign Application Priority Data
Jun. 30, 2006 (GB) .................................. 0613343.3

(51) Int. Cl.
*A47L 9/00* (2006.01)
(52) U.S. Cl. .................................. 16/18 R; 16/19; 16/32
(58) Field of Classification Search .................. 16/18 R, 16/19, 45, 47, 48, 20, 23, 32, 33, 42 R, 18 A; 280/43, 79.11, 87.041, 47.11
See application file for complete search history.

(56) References Cited

U.S. PATENT DOCUMENTS

| | | | | |
|---|---|---|---|---|
| 2,445,865 A | * | 7/1948 | Sleeper | 16/35 R |
| 3,884,493 A | * | 5/1975 | Weir et al. | 280/79.11 |
| 6,908,087 B2 | | 6/2005 | Wintersgill et al. | |
| 7,231,689 B2 | * | 6/2007 | Scheiber et al. | 16/19 |
| 7,353,566 B2 | * | 4/2008 | Scheiber et al. | 16/19 |

FOREIGN PATENT DOCUMENTS

| | | |
|---|---|---|
| DE | 9211745 U1 | 11/1992 |
| FR | 2011023 A | 2/1970 |
| GB | 2278773 A | 12/1994 |
| NL | 7115251 A | 5/1973 |
| WO | WO 9421507 A | 9/1994 |
| WO | WO 9835841 A1 | 8/1998 |
| WO | WO 9915346 A | 4/1999 |

* cited by examiner

*Primary Examiner* — William L. Miller (57) ABSTRACT

The present invention relates to castor wheel assemblies, in particular but not exclusively, to castor wheel assemblies of a type suitable for use with trolleys, for example supermarket trolleys or luggage trolleys. Embodiments of the invention provide a swivel castor wheel assembly configured to support an object to be moved across a surface, the assembly comprising a swivel castor wheel having an axis of wheel rotation and a steering axis and mounted on a first member, wherein the first member is configured for connection to the object in such a way that the steering axis can be moved between first and second different rake angles without substantially changing a height of the object over the surface.

4 Claims, 10 Drawing Sheets

CASTOR ASSEMBLY

RELATED APPLICATIONS

The present application is a 35 U.S.C. §371 national phase application of PCT International Application No. PCT/GB2007/050358, having an international filing date of Jun. 26, 2007, claiming priority to Great Britain Patent Application No. 0613343.3, filed Jun. 30, 2006. The disclosures of each application are incorporated herein by reference in their entireties. The above PCT International Application was published in the English language and has International Publication No. WO 2008/001131A1.

BACKGROUND OF THE INVENTION

The present invention relates to castor wheel assemblies, in particular but not exclusively, to castor wheel assemblies of a type suitable for use with trolleys, for example supermarket trolleys or luggage trolleys.

It is known to fit castor wheels, in particular swivel castor wheels, to a variety of vehicles including trolleys or carts for use in warehouses, hospitals and retail establishments for use in transporting goods or persons.

In order to provide a high level of maneuverability, swivel castor wheel assemblies are typically provided at each of four corners of the vehicle so that the vehicle may be pushed in any direction over a floor. For example, a vehicle may be pushed in a forward direction, a backward direction, or sideways. The problem exists, however, that such vehicles lack directional stability. This can lead to difficulties in maneuvering a vehicle such as a shopping trolley or cart, which may in turn lead to accidental collisions and possible injuries.

It is helpful to consider the geometrical factors involved. In the field of motorcycle engineering, it is usual to speak in terms of the rake and the trail of the front steering system. Rake is the angle measured between the steering axis and vertical. The steering axis is the line about which the steering system turns. Trail is the distance measured from where the steering axis meets the ground to where a vertical line drawn though the front axle meets the ground. It can be thought of as the distance that the front wheel "trails" the steering axis.

The effects that rake and trail have on steering performance can be considered using a shopping trolley front wheel as an example. The front wheel of a shopping cart is a castor that has a vertical steering axis that is in front of the wheel. The vertical steering axis results in zero rake, and having the pivot in front of the wheel results in a significant amount of trail. This results in the front wheel tracking directly behind the pivot regardless of the direction the trolley is pushed. If the vertical pivot axis were directly above the wheel axle, the wheel would not track directly behind the pivot. In this case both the trail and the rake would be zero resulting in a wheel that has as much possibility of turning sideways as it does going straight. This is a very unstable condition for a shopping trolley.

It is known, for example in the field of automotive engineering, that mounting the front or rear wheels of a vehicle in a rearwardly-raked configuration can improve tracking and directional stability. However, motor vehicles are generally designed for high speed travel in a forwards direction only, and do not have swivel castor wheel assemblies.

One possible way of improving forward directional stability of a supermarket trolley is therefore to arrange the rear swivel castors so that they have a degree of rearward rake as well as a degree of trail. However, if a swivel castor with trail is also raked, this causes problems when the steering angle is changed. This is because the steering axis is not normal to the surface over which the castor moves, and if there is a non-zero amount of trail, the axis of rotation of the castor wheel will move upwardly or downwardly with respect to the point of attachment of the castor wheel to the trolley. If the trolley is heavy or full of goods, this lifting effect can cause serious difficulties for the operator manipulating the trolley.

SUMMARY OF THE INVENTION

In a first aspect of the present invention there is provided a swivel castor wheel assembly configured to support an object to be moved across a surface, the assembly comprising a swivel castor wheel having an axis of wheel rotation and a steering axis and mounted on a first member, wherein the first member is configured for connection to the object in such a way that the steering axis can be moved between first and second different rake angles without substantially changing a height of the object over the surface.

It is not necessary for the first member to be coincident with the steering axis although in some embodiments it may be.

The invention has the advantage of enhancing a directional stability of a vehicle to which a wheel assembly according to the invention is fitted when the vehicle is moved in a forward direction. This enhancement in directional stability is achieved by allowing the first member to assume a rearwardly-raked configuration when the vehicle is pushed in a forward direction. Such a configuration is known to enhance a directional stability of a vehicle having backward-raked rear wheels. When the vehicle is pulled in a backward direction, the swivel castor swivels about its steering axis and the first member concomitantly moves from the rearwardly-raked configuration to, preferably, a configuration having less or even zero rake, without the swivel about the steering axis causing the vehicle to be raised or lowered with respect to the surface.

In other words, the swivel castor wheel assembly is movable between differently-raked configurations responsive to a direction of travel while maintaining substantially constant a vertically-resolved distance between the axis of wheel rotation and the object to which the assembly is attached.

This feature has the advantage that directional stability of the wheel assembly is increased when the wheel assembly is moved in a forward direction, and not substantially impaired when the wheel assembly is moved in a backward direction.

Preferably, the steering axis is adapted to assume the first rake angle when the assembly is moved in a forward direction and the second rake angle when the assembly is moved in a backward direction opposite the forward direction.

Preferably, the first rake angle is greater than the second rake angle.

Preferably, the second rake angle corresponds to rake in a direction opposite that of the first rake angle.

Thus, directional stability of the wheel assembly is improved for movement in both forward and backward directions, relative to a wheel assembly having a steering axis fixed in a substantially upright orientation.

Preferably, the first member is hingedly or pivotally connected to a second member, which itself is hingedly or pivotally connected to the object. The first and second members therefore in combination provide an arm with an elbow, which allows the rake angle of the steering axis to be changed without lifting or lowering the object.

Preferably, the assembly further includes a curved runner, and wherein a projection is provided on the first member such that the projection moves along the runner to keep the height of the object over the surface substantially constant.

Preferably, the projection comprises a runner wheel having an axis of rotation substantially normal to the steering axis.

Alternatively, the first member may be provided with a pair of projections disposed in spaced apart relation along a length of the first member, the projections being configured to slidably engage respective first and second slide members of the assembly.

The first slide member may be provided above the second slide member, both slide members being closer to said surface at a rearward end of the members relative to a forward end of the members.

Preferably, a vertical distance between the first and second slide members is lower at a rearward end of the members relative to a forward end of the members.

In a second aspect of the invention there is provided a trolley or the like provided with at least one swivel castor wheel assembly.

Preferably, the trolley is provided with two swivel castor wheel assemblies.

Preferably the two swivel castor wheel assemblies are provided as rear wheels.

In certain circumstances it may be desirable to provide castor wheel assemblies according to embodiments of the invention in place of all castor wheels of a trolley.

For a better understanding of the present invention and to show how it may be carried into effect, reference shall now be made by way of example to the accompanying drawings, in which:

DETAILED DESCRIPTION OF THE INVENTION

According to a first embodiment of the invention a wheel assembly 100 has a castor unit 110 having a body portion 112 and a wheel 114. The castor unit 110 is connected to an elongate first member 120, such that the first member 120 is substantially co-incident with a steering axis of the castor unit 110.

A first end 132 of a link arm 130 is connected to the first member 120 at a position of the first member proximate first end 122 opposite a second end 124 to which the castor unit 110 is attached. An opposite end 134 of the link arm 130 is connected to a chassis 200 of a trolley (not shown).

Figure 6:
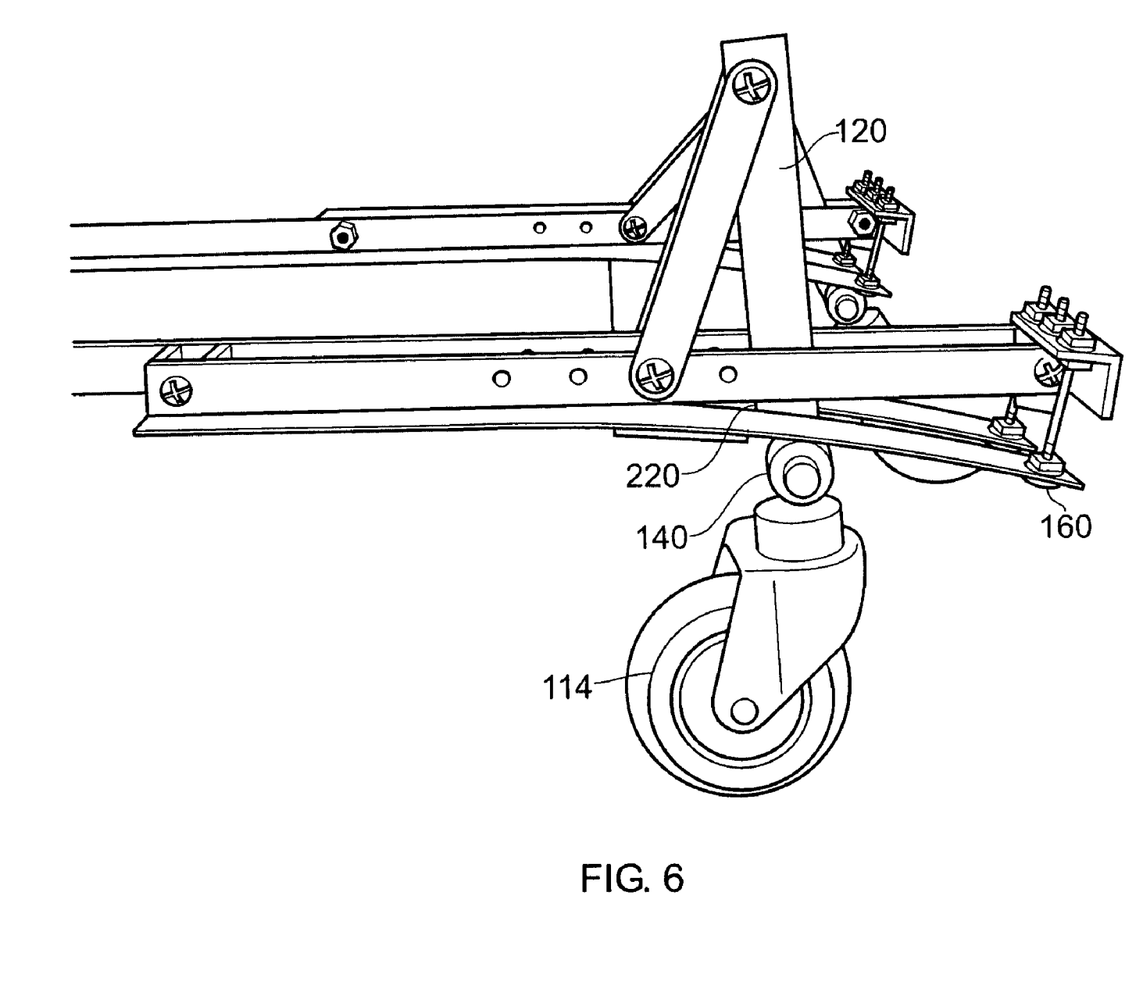

Proximate a second end 124 of the first member 120 a wheel 140 is rotatably attached to the first member 120. The wheel 140 is arranged to support chassis 200 by abutment with a curved runner 150 mounted to an underside of the chassis 200. Wheel 140 is slidable along runner 150 between a first stop 160 at a rear end of the runner 150, and a forward position 165 of the runner. Movement of the wheel 140 beyond the forward position 165 is prevented by abutment of first member 120 with a chassis stop 220 (FIG. 6).

Figure 1:
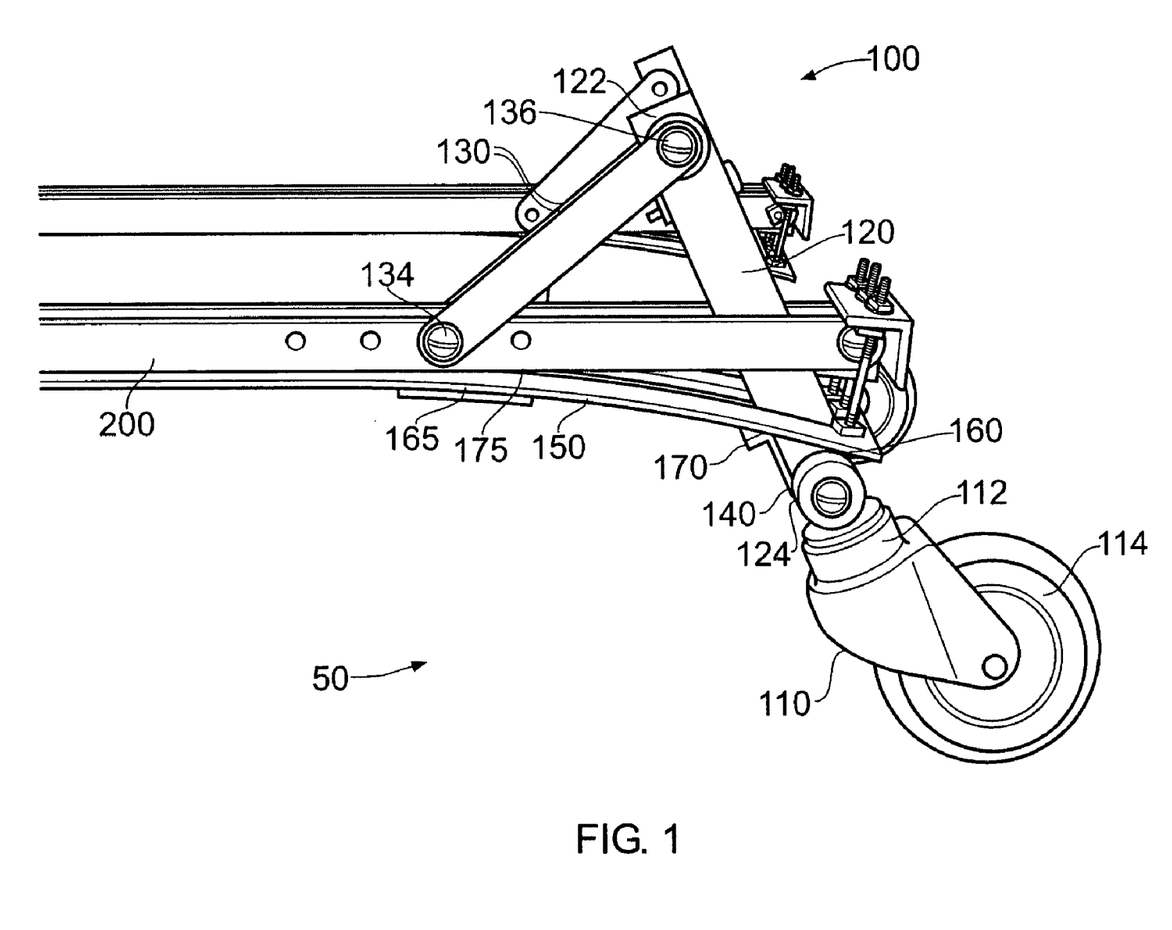
FIG. 1 shows a wheel assembly according to a first embodiment of the invention in a backward-raked configuration.
Figure 2:
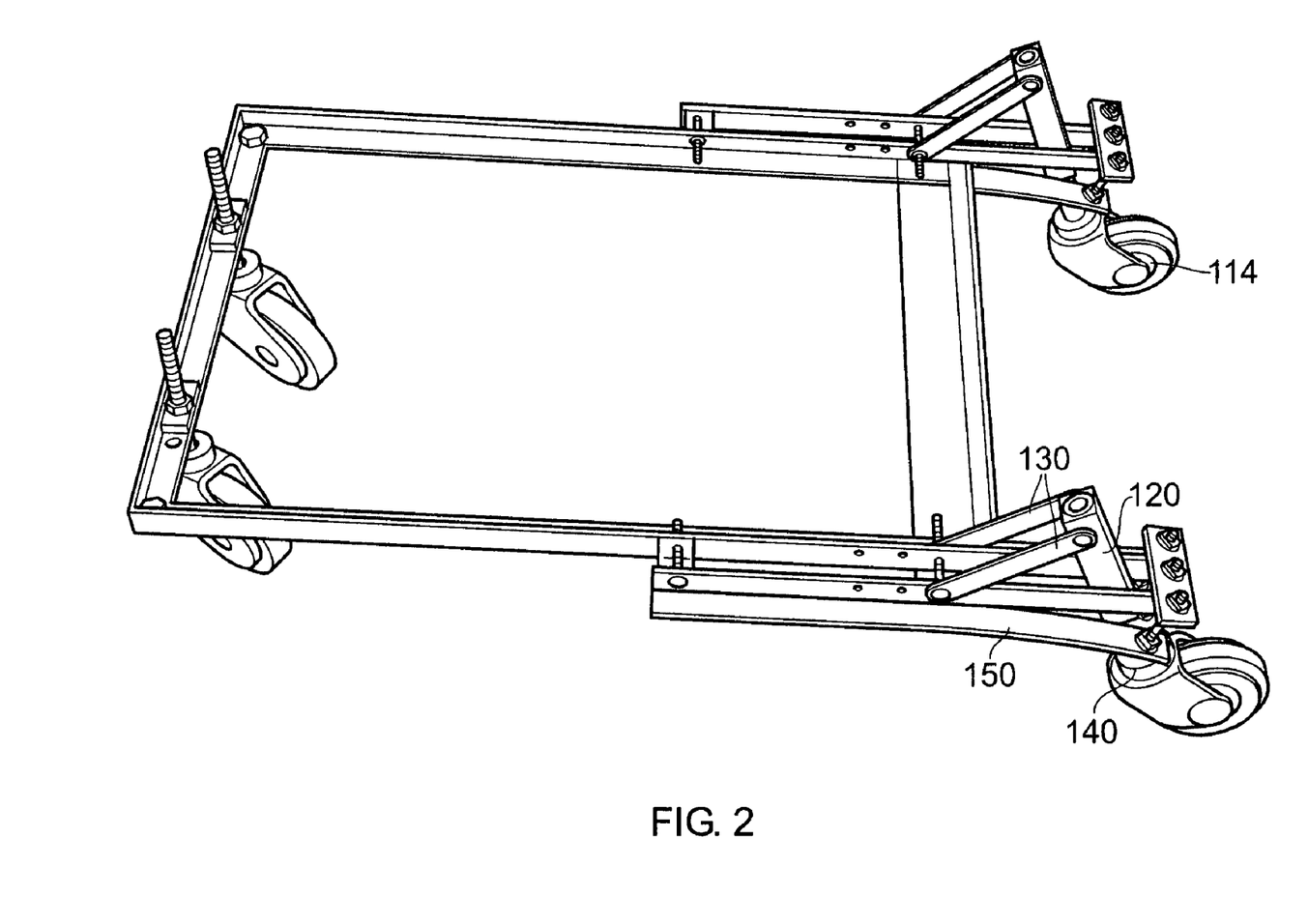
FIG. 2 is a perspective view of a trolley chassis equipped with a pair of wheel assemblies according to the first embodiment.
Figure 3:
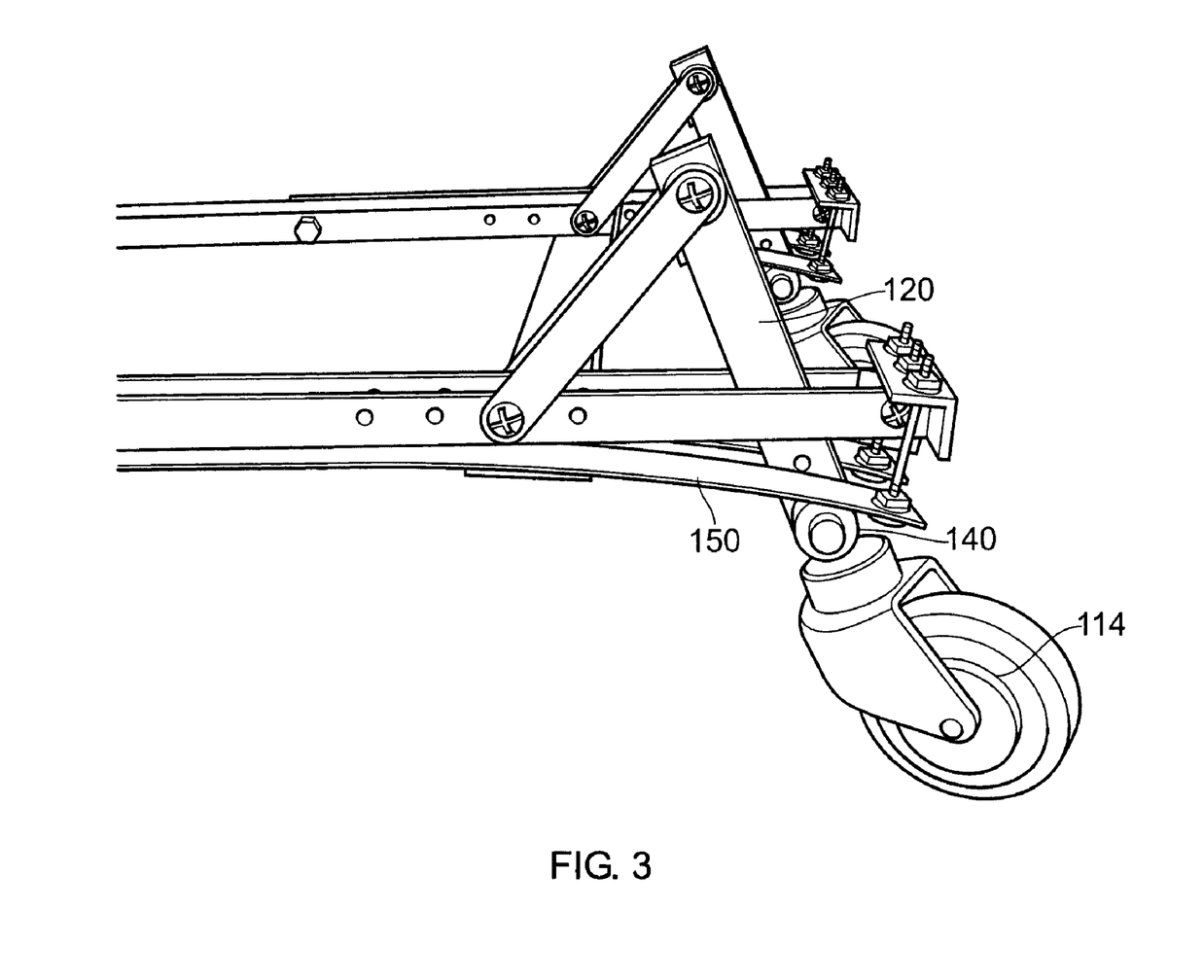
FIGS. 3 to 6 show a wheel assembly according to the first embodiment as the wheel unit transitions between a backward-raked configuration and a reduced backward-raked configuration upon being pulled in a backward direction.
Figure 4:
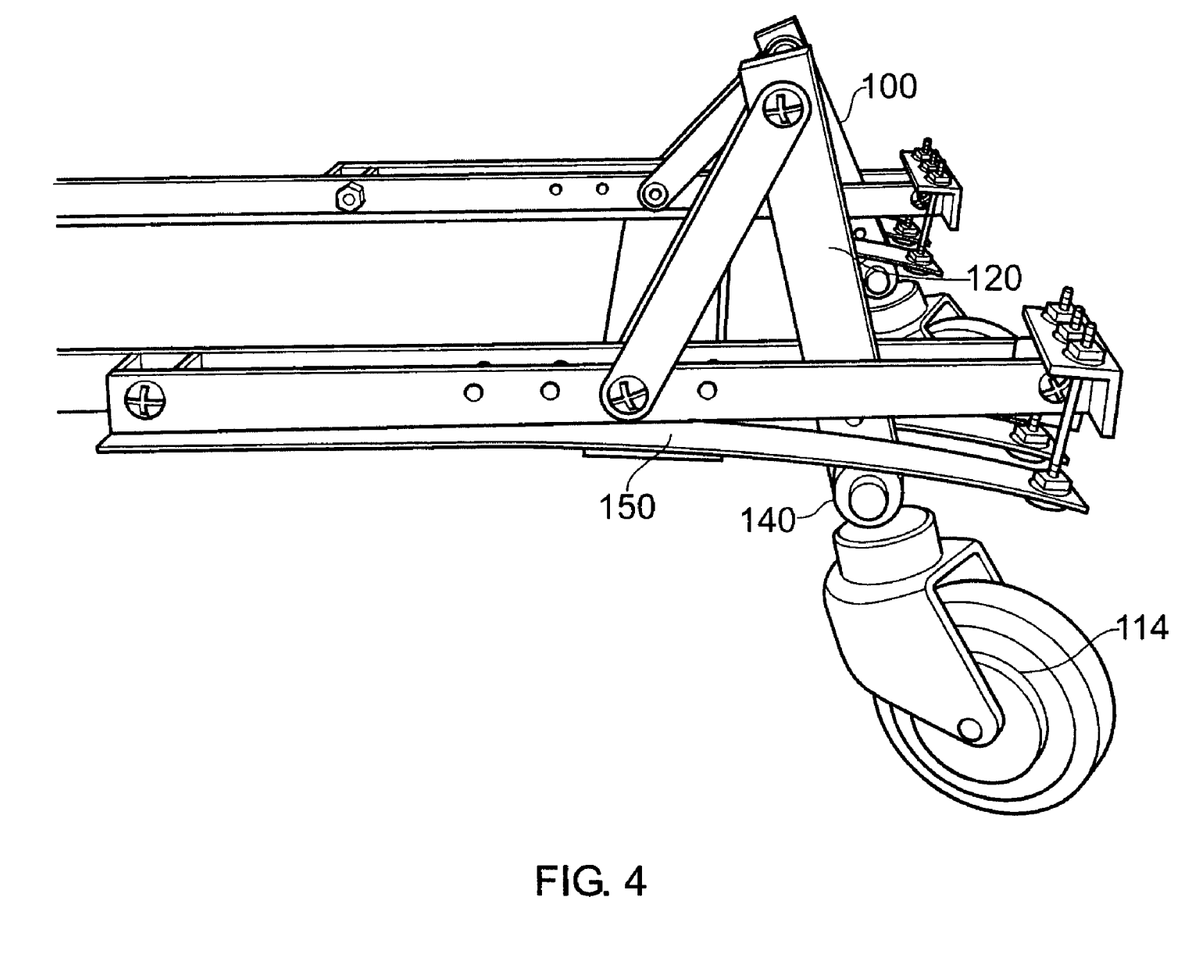
Figure 5:
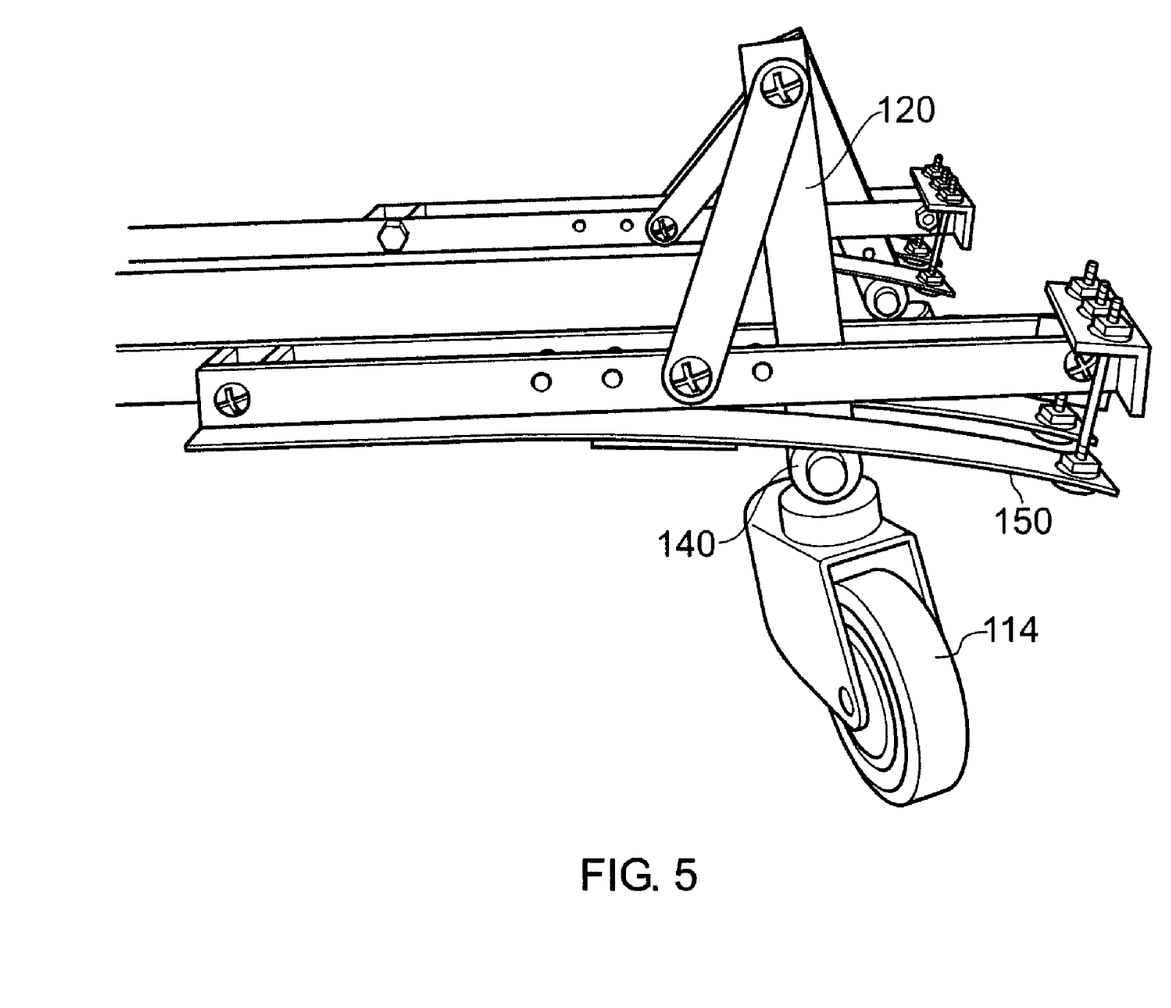

When the chassis is moved in a forward direction the castor unit 110 assumes a backward-raked configuration as wheel 140 rolls along runner 150 to abut stop 160 (FIG. 1).

If movement of the chassis in a forward direction is subsequently arrested and the chassis is moved in a backward direction, a directional instability of castor wheel 114 results in a twisting of castor wheel 114 about its steering axis. This twisting action provides a resistance to backward movement of castor unit 114 (FIG. 3) and wheel 140 beings to roll along runner 150 (FIGS. 3 to 6).

As first member 120 approaches a substantially upright orientation, abutment of first member 120 with chassis stop 220 prevents further movement of wheel 140 away from stop 160. As shown in FIG. 6, castor wheel 114 now faces in a backward direction. Furthermore, a transverse distance between the chassis 200 and surface 50 over which the chassis is moved is substantially the same in forward movement (FIG. 1) and backward movement (FIG. 6) configurations of wheel assembly 100.

A lip 170 (FIG. 1) is provided on the first member 120 that is operable to rest above a lip stop 175 provided adjacent a forward end of runner 150 when the first member is in abutment with stop 160. Abutment of lip 170 with lip stop 175 prevents wheel 140 of first member 120 from being drawn away from runner 150 as the wheel assembly is moved in a backward direction.

Figure 7:
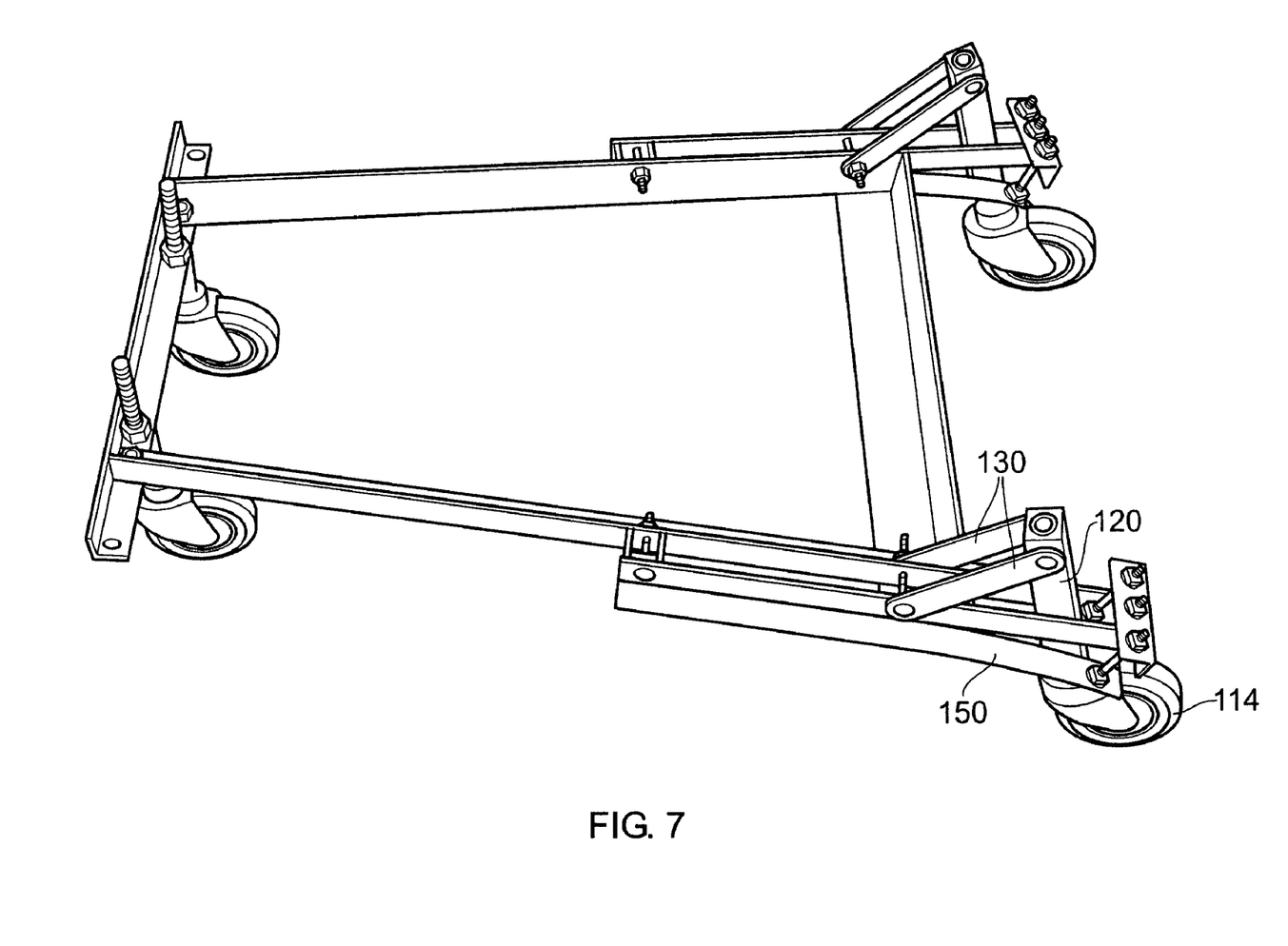
FIG. 7 shows a perspective view of a trolley chassis having a pair of wheel assemblies according to the first embodiment arranged in an inward-tapered configuration.
Figure 8:
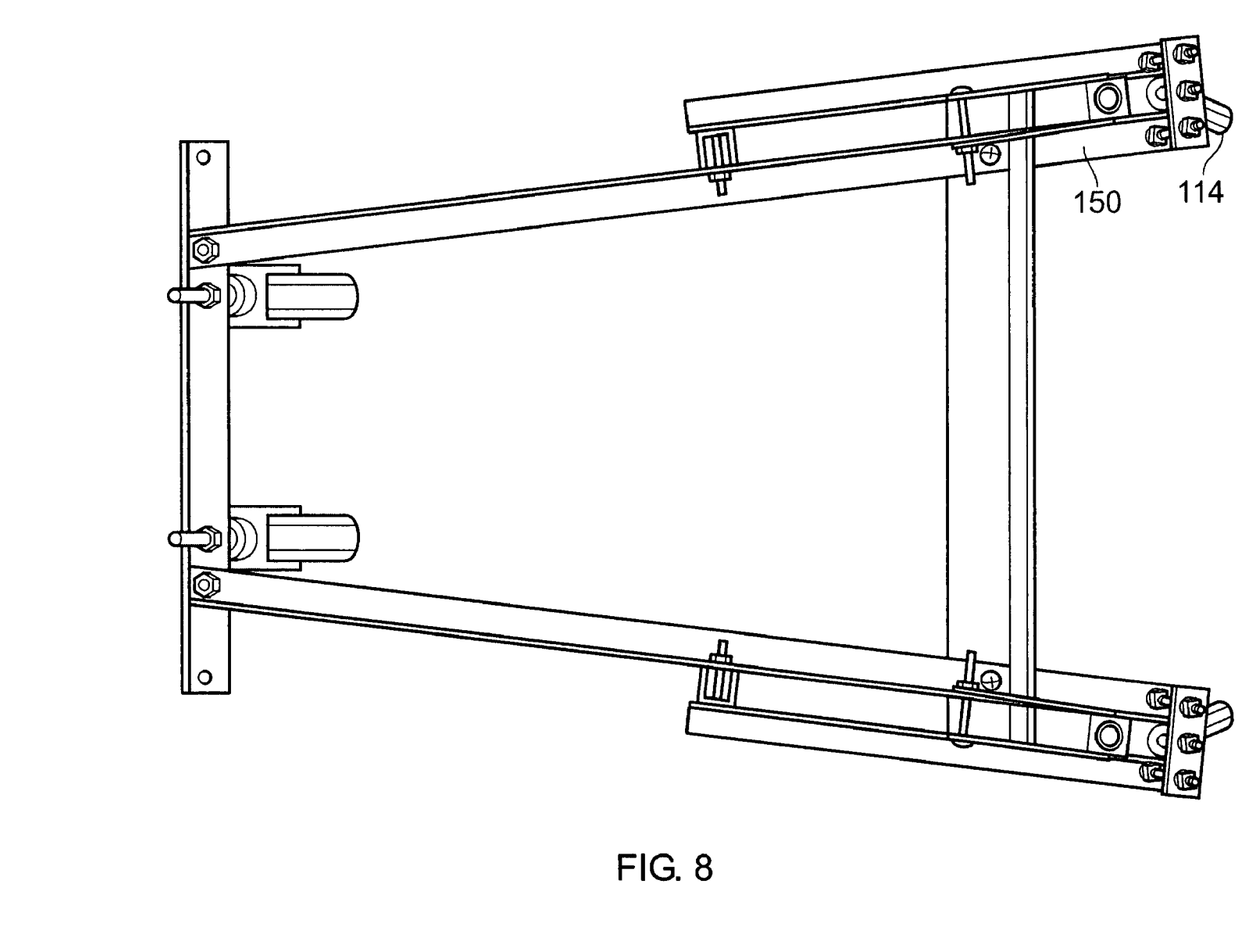
FIG. 8 shows the trolley chassis of FIG. 7 in plan view.

FIGS. 7 and 8 show a variation of the first embodiment in which runners 150 on opposite sides of chassis 200 are angled (or "tapered") towards one another, a distance between the leading edges of the runners being less than a distance between trailing edges of the runners. The taper is substantially symmetrical about a longitudinal axis of the chassis. The presence of taper further promotes directional stability in embodiments of the invention.

In an alternative embodiment of the invention (FIG. 9) first member 320 is provided with a pair of rollers 330A, 330B disposed along a length of first member 320. Rollers 330A, 330B engage tracks 350A, 350B respectively. Track 350A is located above track 350B. A transverse distance "A1" (FIG. 9) between tracks 350A, 350B towards a rear end 301 of wheel assembly 300 is smaller than a corresponding distance "A2" between tracks 350A, 350B towards a front end 302 of wheel assembly 300.

Figure 9:
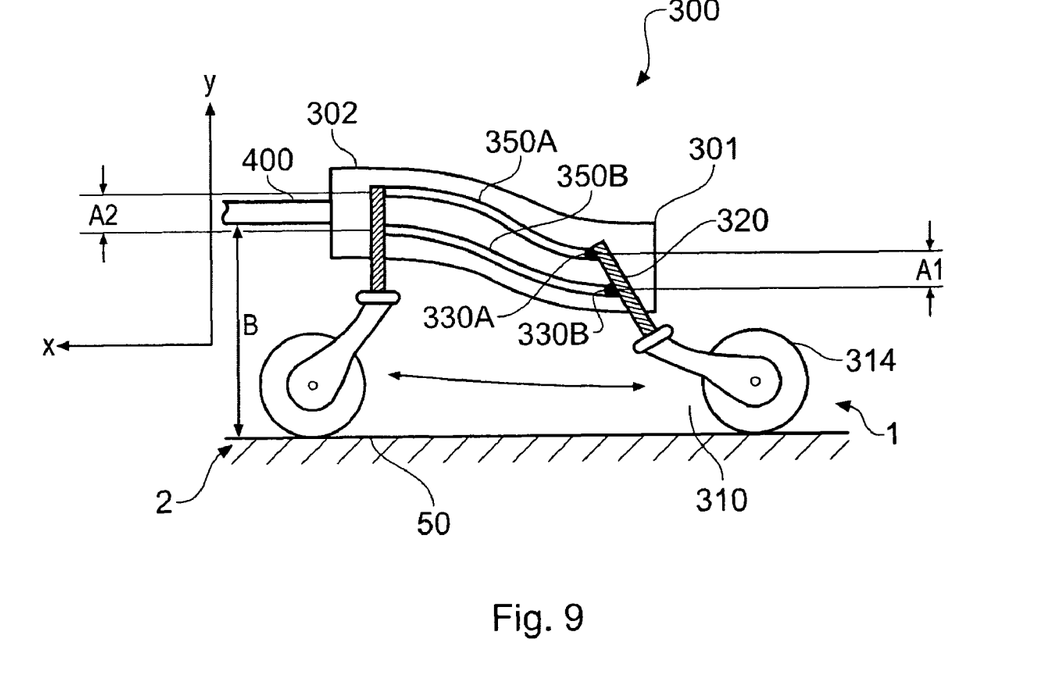
FIG. 9 shows a schematic side view of a wheel assembly according to an alternative embodiment of the invention.
Figure 10:
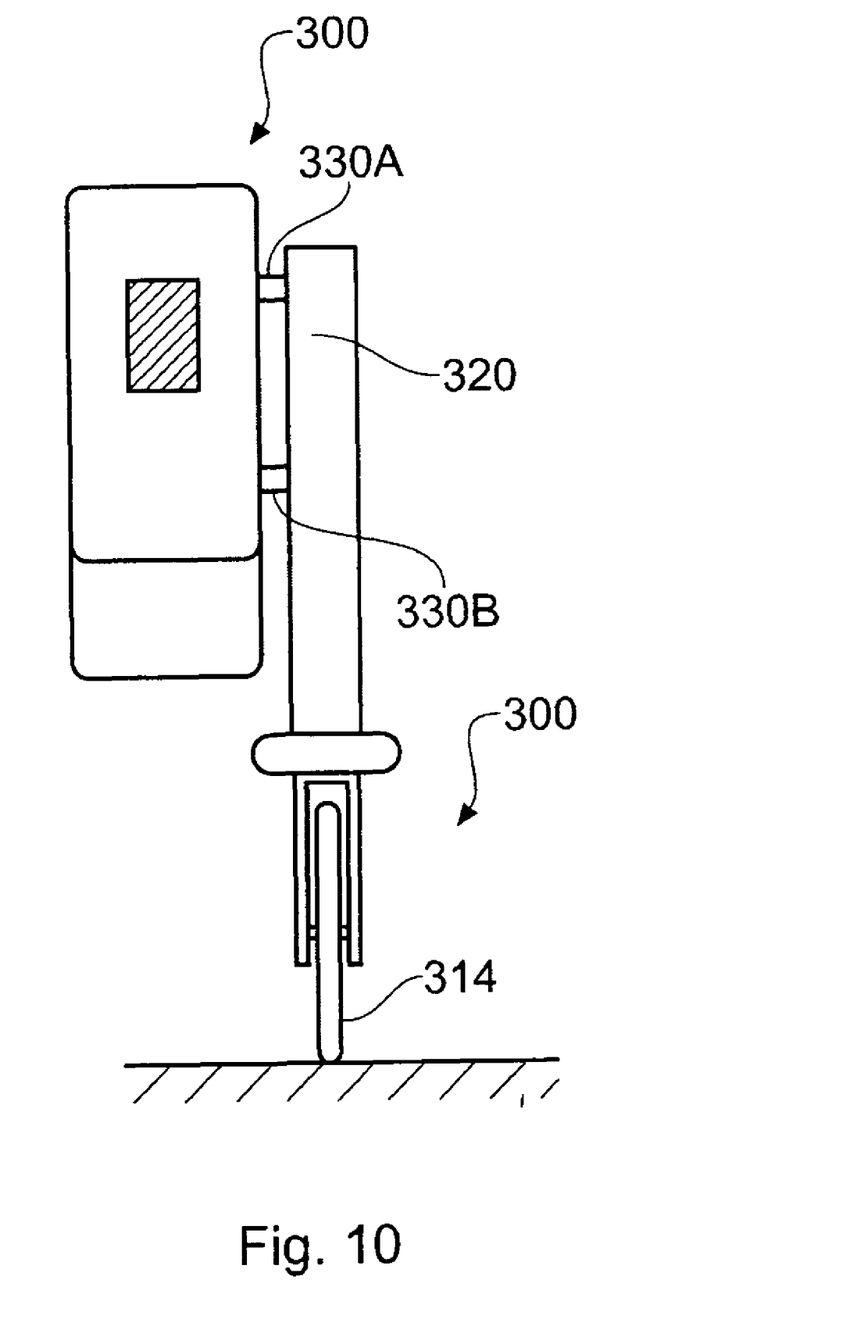
FIG. 10 shows a front view of a wheel assembly according to the alternative embodiment of FIG. 9.

As the wheel assembly is moved in a forward direction (in a positive direction along the X axis) castor unit 310 assumes a first configuration indicated by numeral 1 in FIG. 9. If a directional movement is subsequently reversed, a directional instability of wheel 314 will cause wheel 314 to rotate about its steering axis coincident with first member 320. As wheel 314 rotates about the steering axis, resistance to continued movement in a backward direction causes first member 320 to slide along tracks 350A, 350B to a backward configuration indicated by numeral 2 in FIG. 9.

Clearly, an angle or rake of first member 320 is decreased as first member 320 slides in a forward direction along tracks 350A, 350B. Furthermore, a transverse distance "B" between chassis 400 and surface 50 over which the assembly is to be moved remains substantially constant as chassis 200 transitions between movement in a forward direction, with castor unit 310 in configuration 1 (FIG. 9) and movement in a backward direction, with castor unit 310 in configuration 2.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A swivel castor wheel assembly configured to support a vehicle to be moved across a surface, the assembly comprising:
    the vehicle having front and rear wheels for movement across the surface;
    each rear wheel comprising a respective swivel castor wheel mounted on a first member, the swivel castor wheel having an axis of wheel rotation and a steering axis substantially coextensive with the first member and substantially normal to the axis of wheel rotation, wherein the first member is hingedly connected to a second member, and the second member is hingedly connected to the vehicle such that the steering axis is moved between first and second different rake angles without substantially changing a height of the vehicle above the surface;
    a curved runner cooperating with each first member, and wherein a projection is provided on the first member such that the projection moves along the runner to keep the height of the vehicle above the surface substantially constant; and
    wherein the projection comprises a runner wheel having an axis of rotation substantially normal to the steering axis.

2. The assembly of claim 1, wherein the steering axis is adapted automatically to assume the first rake angle when the assembly is moved in a forward direction and the second rake angle when the assembly is moved in a backward direction opposite the forward direction.

3. The assembly of claim 1, wherein the first rake angle is greater than the second rake angle.

4. The assembly of claim 1, wherein the second rake angle corresponds to rake in a direction opposite to that of the first rake angle.

* * * * *